(12) United States Patent
Shafiee Ardestani et al.

(10) Patent No.: US 11,861,328 B2
(45) Date of Patent: *Jan. 2, 2024

(54) PROCESSOR FOR FINE-GRAIN SPARSE INTEGER AND FLOATING-POINT OPERATIONS

(71) Applicant: Samsung Electronics Co., Ltd., Suwon-si (KR)

(72) Inventors: Ali Shafiee Ardestani, Santa Clara, CA (US); Joseph H. Hassoun, San Jose, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 310 days.

This patent is subject to a terminal disclaimer.

(21) Appl. No.: 17/133,288

(22) Filed: Dec. 23, 2020

(65) Prior Publication Data

US 2022/0147313 A1    May 12, 2022

Related U.S. Application Data

(60) Provisional application No. 63/112,299, filed on Nov. 11, 2020.

(51) Int. Cl.
  *G06F 7/487*   (2006.01)
  *G06F 7/485*   (2006.01)
  (Continued)

(52) U.S. Cl.
  CPC ............ *G06F 7/4876* (2013.01); *G06F 7/485* (2013.01); *G06F 7/5443* (2013.01); *G06N 3/063* (2013.01)

(58) Field of Classification Search
  CPC .... G06F 7/4876; G06F 7/4836; G06F 7/5443; G06F 7/485
  See application file for complete search history.

(56) References Cited

U.S. PATENT DOCUMENTS 7,428,566 B2   9/2008   Siu et al.
8,533,656 B1   9/2013   Nnaji
(Continued)

OTHER PUBLICATIONS

Lanuzza et al., "Cost-Effective Low-Power Processor-In-Memory-based Reconfigurable Datapath for Multimedia Applications", Proceedings of the 2005 International Symposium on Low Power Electronics and Design, Aug. 8, 2005. (Year: 2005).*

(Continued)

*Primary Examiner* — Michael D. Yaary
(74) *Attorney, Agent, or Firm* — Lewis Roca Rothgerber Christie LLP

(57) ABSTRACT

A processor for fine-grain sparse integer and floating-point operations and method of operation thereof are provided. In some embodiments, the method includes forming a first set of products, and forming a second set of products. The forming of the first set of products may include: multiplying, in a first multiplier, a second multiplier, and a third multiplier, the first activation value by a first least significant sub-word, a second least significant sub-word, and a most significant sub-word; and adding a first resulting partial product and a second resulting partial product. The forming of the second set of products may include forming a first floating point product, the forming of the first floating point product including multiplying, in the first multiplier, a first sub-word of a mantissa of an activation value by a first sub-word of a mantissa of a weight, to form a third partial product.

20 Claims, 4 Drawing Sheets

(51) Int. Cl.
 *G06F 7/544* (2006.01)
 *G06N 3/063* (2023.01)

(56) References Cited

U.S. PATENT DOCUMENTS

| | | | |
|---|---|---|---|
| 9,818,059 B1* | 11/2017 | Woo | G06N 3/0454 |
| 9,935,650 B2 | 4/2018 | Dickie | |
| 10,769,526 B2 | 9/2020 | Daga et al. | |
| 2017/0316311 A1 | 11/2017 | Pilly et al. | |
| 2019/0042198 A1* | 2/2019 | Langhammer | G06F 7/5443 |
| 2019/0065150 A1 | 2/2019 | Heddes et al. | |
| 2019/0171927 A1 | 6/2019 | Diril et al. | |
| 2019/0228293 A1 | 7/2019 | Imber et al. | |
| 2020/0034148 A1 | 1/2020 | Sumbul et al. | |
| 2020/0051309 A1 | 2/2020 | Labbe et al. | |
| 2020/0057934 A1 | 2/2020 | Yoo et al. | |
| 2020/0117453 A1 | 4/2020 | Zhang et al. | |
| 2020/0158514 A1 | 5/2020 | Moloney et al. | |
| 2020/0160112 A1 | 5/2020 | Dennison et al. | |
| 2020/0210839 A1 | 7/2020 | Lo et al. | |
| 2020/0226444 A1 | 7/2020 | Sharma et al. | |
| 2020/0264876 A1 | 8/2020 | Lo et al. | |
| 2020/0285949 A1 | 9/2020 | Baum et al. | |
| 2020/0320375 A1* | 10/2020 | Abuhatzera | G06N 3/0481 |
| 2020/0349106 A1 | 11/2020 | Ovsiannikov | |
| 2020/0349420 A1 | 11/2020 | Ovsiannikov et al. | |
| 2022/0147312 A1* | 5/2022 | Shafiee Ardestani | G06F 7/485 |

OTHER PUBLICATIONS

Chen, Y. et al., "A Survey of Accelerator Architectures for Deep Neural Networks", Engineering, Jan. 29, 2020, pp. 264-274, Elsevier Ltd.
"NVIDIA Deep Learning Accelerator", 4 pages, retrieved from URL: http://nvdla.org on Dec. 22, 2020.
Park, E. et al., "Energy-efficient Neural Network Accelerator Based on Outlier-aware Low-precision Computation", 2018 ACM/IEEE 45th Annual International Symposium on Computer Architecture, IEEE Computer Society, 2018, pp. 688-698, IEEE.
Unpublished U.S. Appl. No. 17/110,266, filed Dec. 2, 2020.
Unpublished U.S. Appl. No. 17/131,357, filed Dec. 22, 2020.
Zhao, R. et al., "Overwrite Quantization: Opportunistic Outlier Handling for Neural Network Accelerators", Oct. 13, 2019, 9 pages, arXiv:1910.06909v1.
Judd, P. et al., "Stripes: Bit-Serial Deep Neural Network Computing", 2016, 12 pages, IEEE.
U.S. Office Action dated Dec. 29, 2022, issued in U.S. Appl. No. 17/131,357 (53 pages).
U.S. Final Rejection for U.S. Appl. No. 17/131,357 dated Jun. 27, 2023, 10 pages.

* cited by examiner

PROCESSOR FOR FINE-GRAIN SPARSE INTEGER AND FLOATING-POINT OPERATIONS

CROSS-REFERENCE TO RELATED APPLICATION(S)

The present application claims priority to and the benefit of U.S. Provisional Application No. 63/112,299, filed Nov. 11, 2020, entitled "SYSTEM AND METHOD FOR IMPROVING AREA AND POWER EFFICIENCY BY REDISTRIBUTING WEIGHT NIBBLES AND SUPPORT FOR FP16", the entire content of which is incorporated herein by reference.

FIELD

One or more aspects of embodiments according to the present disclosure relate to processing circuits, and more particularly to a system and method for performing sets of multiplications in a manner that accommodates outlier values, and that is capable of performing both integer and floating-point operations.

BACKGROUND

Processors for neural networks may perform large volumes of multiplication and addition operations, some of which may be a poor use of processing resources because a significant fraction of the numbers being processed may be relatively small, and only a small fraction of outliers may be relatively large. Moreover, some operations in such a system may be integer operations and some may be floating point operations, which, if performed on separate respective sets of dedicated hardware may consume significant amounts of chip area and power.

Thus, there is a need for a system and method for performing sets of multiplications in a manner that accommodates outlier values and that is capable of performing both integer and floating-point operations.

SUMMARY

According to an embodiment of the present invention, there is provided a method, including: forming a first set of products, each product of the first set of products being an integer product of a first activation value and a respective weight of a first plurality of weights; and forming a second set of products, each product of the second set of products being a floating-point product of a second activation value and a respective weight of a second plurality of weights, each of the weights of the first plurality of weights including a least significant sub-word and a most significant sub-word; the most significant sub-word of a first weight of the first plurality of weights being nonzero; the most significant sub-word of a second weight of the first plurality of weights being zero; the forming of the first set of products including: multiplying, in a first multiplier, the first activation value by the least significant sub-word of the first weight to form a first partial product; multiplying, in a second multiplier, the first activation value by the least significant sub-word of the second weight; multiplying, in a third multiplier, the first activation value by the most significant sub-word of the first weight to form a second partial product; and adding the first partial product and the second partial product; the forming of the second set of products including forming a first floating point product, the forming of the first floating point product including multiplying, in the first multiplier, a first sub-word of a mantissa of the second activation value by a first sub-word of a mantissa of a first weight of the second plurality of weights, to form a third partial product.

In some embodiments: the first multiplier is configured to receive a first argument and a second argument, the first argument has a first argument size, the second argument has a second argument size, and the first argument size of is greater than the second argument size.

In some embodiments: the forming of the first floating point product includes: receiving, by the first multiplier, a first argument; receiving, by the first multiplier, a second argument; and multiplying the first argument by the second argument; the first argument includes: the first sub-word of the mantissa of the second activation value, and a second sub-word of the mantissa of the second activation value; and the second argument includes the first sub-word of the mantissa of the first weight of the second plurality of weights.

In some embodiments: the forming of the first floating point product includes: receiving, by the first multiplier, a first argument; receiving, by the first multiplier, a second argument; and multiplying the first argument by the second argument; the first argument includes: the first sub-word of the mantissa of the first weight of the second plurality of weights, and a second sub-word of the mantissa of the first weight of the second plurality of weights; and the second argument includes the first sub-word of the mantissa of the second activation value.

In some embodiments, the second multiplier is configured to receive a first argument having a first size and a second argument having a second size, the first size being greater than the second size.

In some embodiments: the forming of the second set of products further includes forming a second floating point product; the forming of the second floating point product includes: receiving, by the second multiplier, a first argument; receiving, by the second multiplier, a second argument; and multiplying the first argument received by the second multiplier by the second argument received by the second multiplier; the first argument received by the second multiplier includes: the first sub-word of the mantissa of the first activation value, and a sub-word composed of zeros; and the second argument received by the second multiplier includes: a third sub-word of the mantissa of the first weight of the second plurality of weights.

In some embodiments, the adding of the first partial product and the second partial product includes performing an offset addition in a first offset adder.

In some embodiments, the forming of the second set of products further includes forming a second floating point product, the forming of the second floating point product including multiplying, in the third multiplier, the first sub-word of a mantissa of the second activation by a second sub-word of a mantissa of the first weight of the second plurality of weights.

In some embodiments, the method further includes adding the first floating point product and the second floating point product.

In some embodiments, the adding of the first floating point product and the second floating point product includes performing an offset addition in the first offset adder.

According to an embodiment of the present invention, there is provided a system, including: a processing circuit including: a first multiplier, a second multiplier, and a third multiplier, the processing circuit being configured to: form a first set of products, each product of the first set of products being an integer product of a first activation value and a respective weight of a first plurality of weights; and form a second set of products, each product of the second set of products being a floating-point product of a second activation value and a respective weight of a second plurality of weights, each of the weights of the first plurality of weights including a least significant sub-word and a most significant sub-word; the most significant sub-word of a first weight of the first plurality of weights being nonzero; the most significant sub-word of a second weight of the first plurality of weights being zero; the forming of the first set of products including: multiplying, in the first multiplier, the first activation value by the least significant sub-word of the first weight to form a first partial product; multiplying, in the second multiplier, the first activation value by the least significant sub-word of the second weight; multiplying, in the third multiplier, the first activation value by the most significant sub-word of the first weight to form a second partial product; and adding the first partial product and the second partial product; the forming of the second set of products including forming a first floating point product, the forming of the first floating point product including multiplying, in the first multiplier, a first sub-word of a mantissa of the second activation value by a first sub-word of a mantissa of a first weight of the second plurality of weights, to form a third partial product.

In some embodiments: the first multiplier is configured to receive a first argument and a second argument, the first argument has a first argument size, the second argument has a second argument size, and the first argument size of is greater than the second argument size.

In some embodiments: the forming of the first floating point product includes: receiving, by the first multiplier, a first argument; receiving, by the first multiplier, a second argument; and multiplying the first argument by the second argument; the first argument includes: the first sub-word of the mantissa of the second activation value, and a second sub-word of the mantissa of the second activation value; and the second argument includes the first sub-word of the mantissa of the first weight of the second plurality of weights.

In some embodiments: the forming of the first floating point product includes: receiving, by the first multiplier, a first argument; receiving, by the first multiplier, a second argument; and multiplying the first argument by the second argument; the first argument includes: the first sub-word of the mantissa of the first weight of the second plurality of weights, and a second sub-word of the mantissa of the first weight of the second plurality of weights; and the second argument includes the first sub-word of the mantissa of the second activation value.

In some embodiments, the second multiplier is configured to receive a first argument having a first size and a second argument having a second size, the first size being greater than the second size.

In some embodiments: the forming of the second set of products further includes forming a second floating point product; the forming of the second floating point product includes: receiving, by the second multiplier, a first argument; receiving, by the second multiplier, a second argument; and multiplying the first argument received by the second multiplier by the second argument received by the second multiplier; the first argument received by the second multiplier includes: the first sub-word of the mantissa of the first activation value, and a sub-word composed of zeros; and the second argument received by the second multiplier includes: a third sub-word of the mantissa of the first weight of the second plurality of weights.

In some embodiments, the adding of the first partial product and the second partial product includes performing an offset addition in a first offset adder.

In some embodiments, the forming of the second set of products further includes forming a second floating point product, the forming of the second floating point product including multiplying, in the third multiplier, the first sub-word of a mantissa of the second activation by a second sub-word of a mantissa of the first weight of the second plurality of weights.

In some embodiments, the processing circuit is further configured to add the first floating point product and the second floating point product.

According to an embodiment of the present invention, there is provided a system, including: means for processing, the means for processing including: a first multiplier, a second multiplier, and a third multiplier, the means for processing being configured to: form a first set of products, each product of the first set of products being an integer product of a first activation value and a respective weight of a first plurality of weights; and form a second set of products, each product of the second set of products being a floating-point product of a second activation value and a respective weight of a second plurality of weights, each of the weights of the first plurality of weights including a least significant sub-word and a most significant sub-word; the most significant sub-word of a first weight of the first plurality of weights being nonzero; the most significant sub-word of a second weight of the first plurality of weights being zero; the forming of the first set of products including: multiplying, in the first multiplier, the first activation value by the least significant sub-word of the first weight to form a first partial product; multiplying, in the second multiplier, the first activation value by the least significant sub-word of the second weight; multiplying, in the third multiplier, the first activation value by the most significant sub-word of the first weight to form a second partial product; and adding the first partial product and the second partial product; the forming of the second set of products including forming a first floating point product, the forming of the first floating point product including multiplying, in the first multiplier, a first sub-word of a mantissa of the second activation value by a first sub-word of a mantissa of a first weight of the second plurality of weights, to form a third partial product.

BRIEF DESCRIPTION OF THE DRAWINGS

These and other features and advantages of the present disclosure will be appreciated and understood with reference to the specification, claims, and appended drawings wherein:

DETAILED DESCRIPTION

The detailed description set forth below in connection with the appended drawings is intended as a description of exemplary embodiments of a processor for fine-grain sparse integer and floating-point operations provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Figure 1:
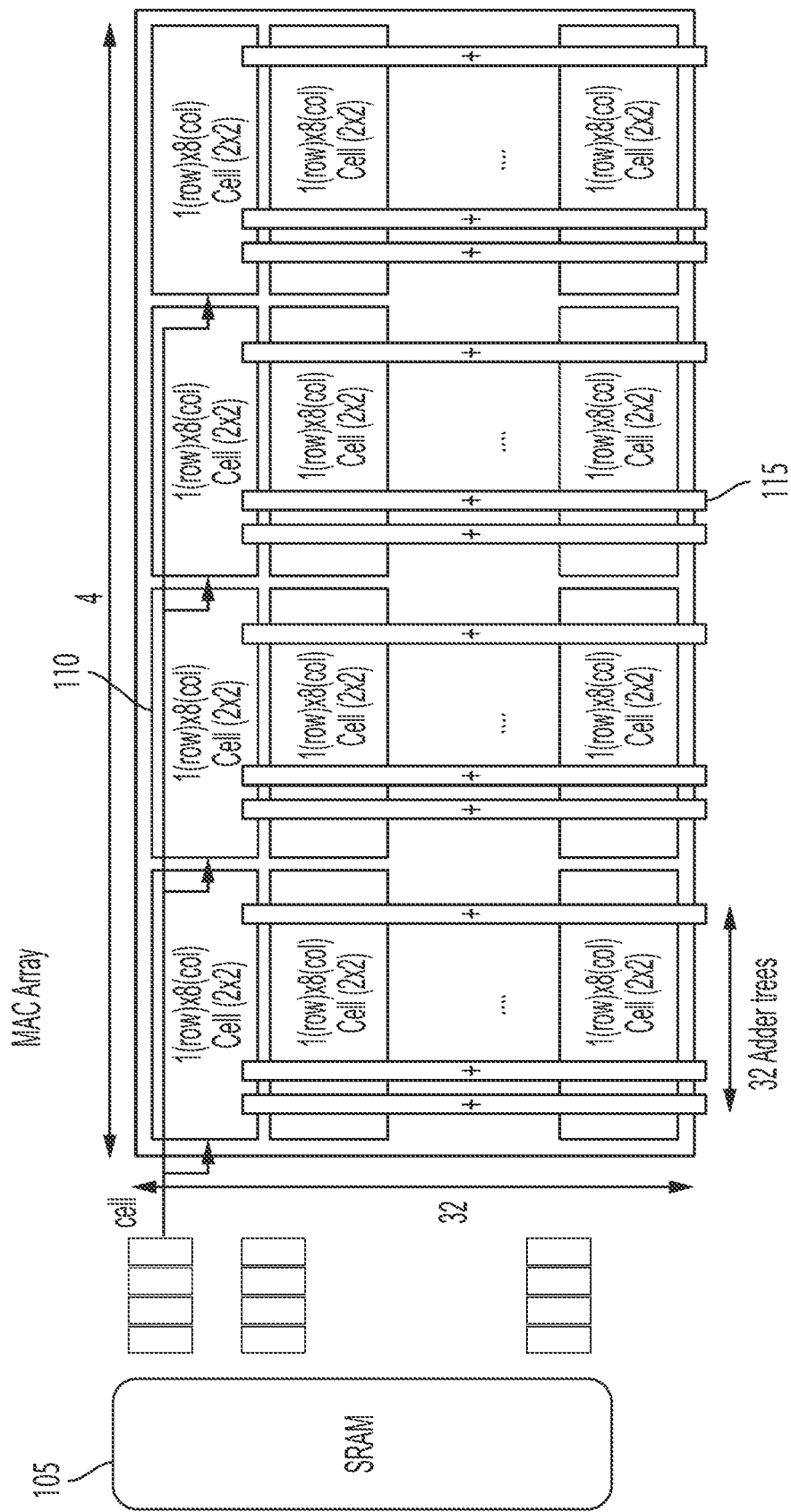
FIG. 1 is a block diagram of a portion of a neural network processor, according to an embodiment of the present disclosure.

A neural network (e.g., when performing inference) may perform voluminous calculations in which activations (or "activation values") (the elements of an input feature map (IFM)) are multiplied by weights. The products of the activations and weights may form multi-dimensional arrays which may be summed along one or more axes to form an array, or "tensor", that may be referred to as an output feature map (OFM). Referring to FIG. 1, special-purpose hardware may be employed to perform such calculations. Activations may be stored in a static random access memory (SRAM) 105 and fed into a multiplier accumulator (MAC) array, which may include (i) a plurality of blocks (which may be referred to as "bricks" 110), each of which may include a plurality of multipliers for multiplying activations and weights, (ii) one or more adder trees for adding together products generated by the bricks, and (iii) one or more accumulators for accumulating sums generated by the adder trees. Each activation value may be broadcast to a plurality of multipliers conceptually arranged in a row in the representation of FIG. 1. A plurality of adder trees 115 may be employed to form sums.

In operation, it may be that the weights fall within a range of values, and that the distribution of the values of the weights is such that relatively small weights are significantly more common than relatively large weights. For example, if each weight is represented as an 8-bit number, it may be that many of the weights (e.g., a majority of the weights, or more than ¾ of the weights) have a value of less than 16 (i.e., the most significant nibble is zero); the weights with nonzero most significant nibbles may then be referred to as "outliers". In some embodiments, suitably constructed hardware may achieve improved speed and power efficiency by taking advantage of these characteristics of the weights.

Figure 2A:
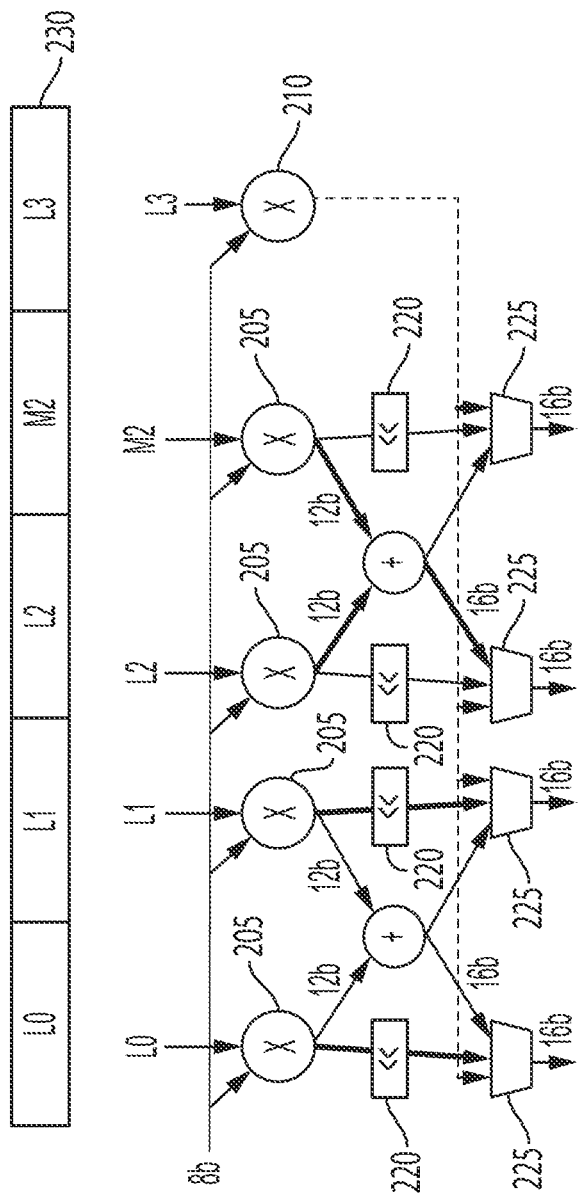
FIG. 2A is a block diagram of a portion of a mixed processing circuit, according to an embodiment of the present disclosure.

FIG. 2A shows a portion of a mixed processing circuit (referred to as "mixed" because it is suitable both for integer and for floating point operations). Referring to FIG. 2A, in some embodiments a plurality of multipliers 205, 210 is used to multiply weights by activations, e.g., one nibble at a time. Each multiplier may be an 8×4 (i.e., an 8-bit by 4-bit) multiplier with a first input configured to receive an activation byte (which may be broadcast to all of the multipliers), and a second input configured to receive a respective weight nibble. The embodiment of FIG. 2A includes four multipliers (which may be referred to as standard multipliers 205) and one reserve multiplier 210 (in some embodiments there are more or fewer standard multipliers 205, or more reserve multipliers), two offset adders 215, four shifters 220, and four output multiplexers 225. Each of the standard multipliers 205 and the reserve multiplier 210 may be an 8×4 (i.e., 8-bit by 4-bit) multiplier. The standard multipliers 205 and the reserve multiplier 210 may be identical circuits differing in how they are connected (as illustrated in FIG. 2A) and in how they are used in operation (as discussed in further detail below). As such, each of these multipliers 205, 210 may receive a first argument (e.g., the activation byte) and a second argument (e.g., the weight nibble, the first argument having a first argument size (e.g., 8 bits, the size of the activation byte) and the second argument having a second argument size (e.g., 4 bits, the size of a weight nibble).

The embodiment of FIG. 2A may be used to perform integer multiplication as follows. The weights are fed into the multipliers, one nibble at a time, from a weight buffer 230 (of which only the output row is shown) and an 8-bit activation value is broadcast to all of the multipliers 205, 210. Weights having nonzero most significant nibbles may be handled differently from weights having zero most significant nibbles (as used herein, a "zero nibble", e.g., a "zero most significant nibble" is a nibble having a value of zero). In the example of FIG. 2A, the left-most multiplier forms the product of (i) an 8-bit activation value and (ii) a first weight, the first weight having a zero most significant nibble. The least significant nibble L0 of the first weight is multiplied by the 8-bit activation value in the left-most standard multiplier 205, producing a 12-bit product, which is converted to a 16-bit number (so that it may be added through the adder tree) by the left-most shifter 220 and fed to the left-most output multiplexer 225.

The second standard multiplier 205 from the left similarly forms the product of the 8-bit activation value and a second weight, having a zero most significant nibble and a nonzero least significant nibble L1. A third weight in the example of FIG. 2A has a nonzero most significant nibble M2, and a least significant nibble L2. This weight is multiplied by the 8-bit activation value in the third and fourth standard multipliers 205 from the left, with the third standard multiplier 205 from the left forming a first partial product by multiplying the 8-bit activation value by the least significant nibble L2, and the fourth standard multiplier 205 from the left forming a second partial product by multiplying the 8-bit activation value by the most significant nibble M2. An offset sum of the two partial products (the latter of which has a significance 4 bits greater than the former) is then formed in the offset adder 215 connected to the two multipliers, the offset of the offset adder 215 ensuring that the bits of the two partial products are properly aligned.

As used herein, an "offset sum" of two values is the result of "offset addition", which is the forming of the sum of (i) a first one of the two values and (ii) the second one of the two values, shifted to the left by a number of bits (e.g., by four bits), and an "offset adder" is an adder that performs the addition of two numbers with an offset between the positions of their least significant bits. As used herein, the "significance" of a nibble (or, more generally, of a sub-word (discussed in further detail below)) is the position it occupies in the word of which it is a part (e.g., whether a nibble is a most significant nibble or a least significant nibble of an 8-bit word). As such, the most significant nibble of an 8-bit word has a significance four bits greater than the least significant nibble.

The product (i.e., the offset sum of the two partial products) is then produced, by the circuit of FIG. 2A, at the output of the third output multiplexer 225 from the left. If all four of the weights had zero most significant nibbles, then it would be possible to form the four products of (i) the activation value and (ii) the four least significant nibbles L0, L1, L2, and L3, in the four standard multipliers 205, and to route the results to the outputs of the four output multiplexers 225 through the four shifters 220. In the example of FIG. 2A, however, the fourth standard multiplier 205 is used to form the second partial product of the activation value with the third weight (consisting of L2 and M2). In this example, the product of the fourth weight (which has the least significant nibble L3 and a zero most significant nibble) is therefore formed in the reserve multiplier 210. A similar configuration may be used if any one of the other three weights has a nonzero most significant nibble instead of the third weight, with one of the other weights (having a zero most significant nibble) being processed in the reserve multiplier 210 to free up a multiplier for forming the second partial product for the weight having a nonzero most significant nibble. As such, the circuit of FIG. 2A can calculate the products of the activation value with any four weights, in one clock cycle, provided that at most one of the four weights has a nonzero most significant nibble. In another embodiment, similar to FIG. 2A but having two reserve multipliers 210, it would be possible to calculate, in an analogous manner, the products of the activation value with any four weights, in one clock cycle, provided that at most two of the four weights had a nonzero most significant nibble.

Figure 2B:
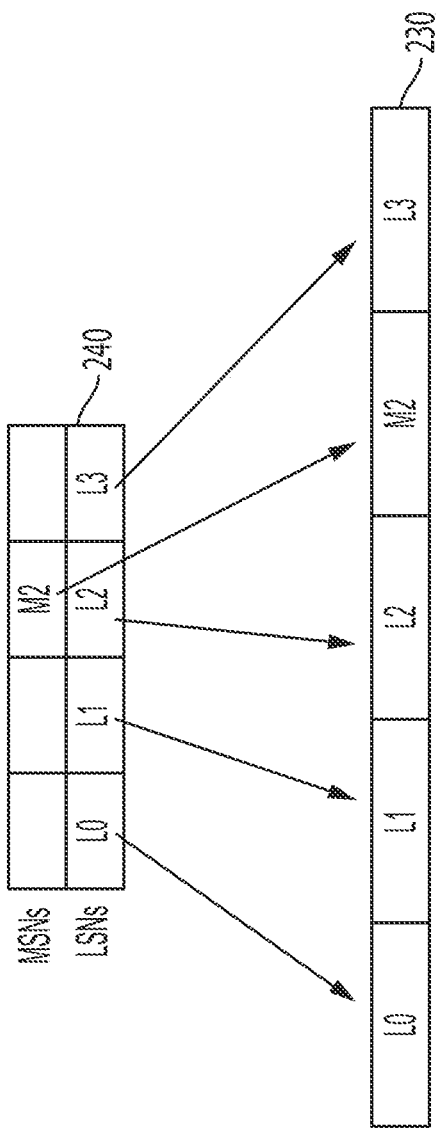
FIG. 2B is a data mapping diagram, according to an embodiment of the present disclosure.

The arrangement of the weight nibbles in the weight buffer 230 may be the result of preprocessing, as illustrated in FIG. 2B. The raw array of weights 240 may include a first row, of least significant nibbles (e.g., L0, L1, L2, and L3) and a second row, of most significant nibbles (containing, in the example of FIG. 2B, only one nonzero most significant nibble M2), as illustrated. The remaining most significant nibbles may be zero, as illustrated by the blank cells in FIG. 2B. Preprocessing may rearrange these nibbles in populating the weight buffer (as indicated, for example, by the arrows in FIG. 2B) so that the weight buffer contains a smaller proportion of zero-valued nibbles than the raw array of weights 240. In the example of FIG. 2B, four weights (each consisting of a least significant nibble and a most significant nibble) are rearranged so that the zero-valued nibbles are discarded, and the non-zero nibbles are placed into five locations of one row of the weight buffer, so that this one row of the weight buffer may be processed at once (e.g., in one clock cycle) by the five multipliers 205, 210 (FIG. 2A). The preprocessing operation may also generate an array of control signals for controlling multiplexers (e.g., the output multiplexers 225), in the mixed processing circuit, that perform routing of data, in accordance with the rearranging described above.

Figure 3B:
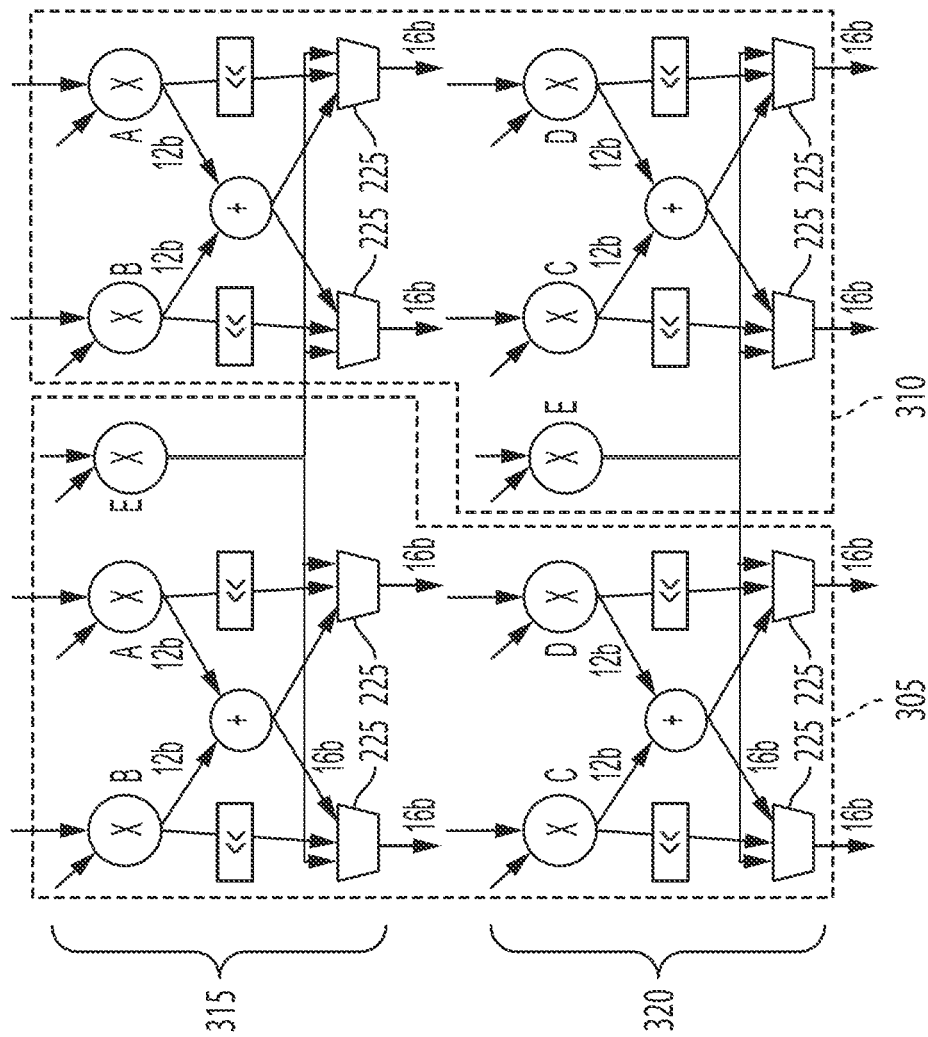
FIG. 3B is a block diagram of a portion of a mixed processing circuit, according to an embodiment of the present disclosure.
Figure 3A:
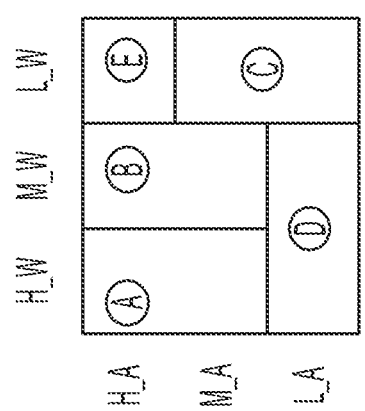
FIG. 3A is a table of floating-point mantissa nibbles, according to an embodiment of the present disclosure.

FIGS. 3A and 3B illustrate how two copies of the circuit of FIG. 2A may be combined to form a first floating-point processing circuit 305 and a second floating-point processing circuit 310, each suitable for forming a floating-point product of an FP16 (half-precision) floating point) activation with an FP16 weight. Multipliers A and B of the first floating-point processing circuit 305 are the two left-most standard multipliers 205 of a first copy 315 of the circuit of FIG. 2A, multipliers C and D of the first floating-point processing circuit 305 are the two left-most standard multipliers 205 of a second copy 320 of the circuit of FIG. 2A, and multiplier E of the first floating-point processing circuit 305 is the reserve multiplier 210 of the first copy 315 of the circuit of FIG. 2A. Similarly, the multipliers A, B, C, D, E of the second floating-point processing circuit 310 include two standard multipliers 205 of the first copy 315 of the circuit of FIG. 2A, two standard multipliers 205 of the second copy 320 of the circuit of FIG. 2A, and the reserve multiplier 210 of the second copy 320 of the circuit of FIG. 2A. In FIG. 3B, each reserve multiplier 210 is shown in the middle of a set of standard multipliers 205 for ease of illustration (instead of being shown to the right, as in FIG. 2A).

Each floating-point number may be an FP16 floating point number (using, e.g., a format according to the IEEE 754-2008 standard) having one sign bit, an 11-bit mantissa (or "significand") (represented by 10 bits and one implicit lead bit or "hidden bit"), and a five-bit exponent. The 11-bit mantissa may be padded with one zero bit and split into three nibbles, a "high" (most significant) nibble, a "low" (least significant) nibble, and a "medium" nibble (of intermediate significance) (so that concatenating the high nibble, the medium nibble, and the low nibble, in order, results in the 12-bit (padded) mantissa). In describing these nibbles in the present disclosure, the qualifier "mantissa" may be omitted for brevity.

The nine cells of the 3×3 table of FIG. 3A shows the mapping of the products of the three nibbles of the activation value (corresponding to the three rows, labeled H_A (for the high nibble of the activation value), M_A (for the medium nibble of the activation value), and L_A (for the low nibble of the activation value)), and the three nibbles of the weight (corresponding to the three columns, labeled H_W (for the high nibble of the weight), M_W (for the medium nibble of the weight), and L_W (for the low nibble of the weight)) to corresponding multipliers in each of the first floating-point processing circuits 305 and the second floating-point processing circuits 310.

In the first floating-point processing circuit 305, the standard multiplier labeled A may multiply (i) the high nibble H_A of the activation value and the medium nibble M_A of the activation value, received at the first (8-bit) input of the standard multiplier A by (ii) the high nibble H_W of the weight, as the corresponding rectangle, also labeled A, of FIG. 3A indicates. Because the standard multiplier A has an 8-bit wide input and a 4-bit wide (nibble wide) input, it is capable of (i) multiplying the high nibble H_A of the activation value by the high nibble H_W and (ii) multiplying the medium nibble M_A of the activation value by the high nibble H_W of the weight, in one operation.

In this manner five corresponding partial products (which may be referred to as partial products A, B, C, D, and E) may be formed. Partial product A has a significance four bits greater than the significance of partial product B, and these two partial products are added together in the offset adder 215 connected to standard multiplier A and standard multiplier B. Similarly, partial product D has a significance four bits greater than the significance of partial product C, and these two partial products are added together in the offset adder 215 connected to multiplier C and multiplier D. The reserve multiplier E may multiply the high nibble H_A of the activation by the low nibble L_W of the weight (the unused 4 bits of the first input of the reserve multiplier E may be set to zero). The sums produced by the two offset adders 215, and the output of the reserve multiplier E may then be added together in the adder tree (which is connected to the outputs of the output multiplexer 225).

Although some examples are presented herein for an embodiment with 8-bit weights, 8-bit activation values, a weight buffer that is five weights wide, and weights and activations that may be processed one nibble at a time, it will be understood that these parameters and other like parameters in the present disclosure are used only as a specific concrete example for ease of explanation, and that any of these parameters may be changed. As such, the size of a weight may be a "word", for example, and the size of a portion of a weight may be a "sub-word", with, in the embodiment of FIGS. 2A and 2B, the size of the word being one byte and the size of a sub-word being one nibble. In other embodiments, a word may be 12 bits and a sub-word may be six bits, for example, or a word may be 16 bits, and a sub-word may be one byte.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, the term "or" should be interpreted as "and/or", such that, for example, "A or B" means any one of "A" or "B" or "A and B".

Each of the terms "processing circuit" and "means for processing" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a processor for fine-grain sparse integer and floating-point operations have been specifically described and illustrated herein, many modifications and variations will be apparent to those skilled in the art. Accordingly, it is to be understood that a processor for fine-grain sparse integer and floating-point operations constructed according to principles of this disclosure may be embodied other than as specifically described herein. The invention is also defined in the following claims, and equivalents thereof.

What is claimed is:

1. A method for performing computations by a neural network via a processing circuit, the method comprising:
  identifying, by the processing circuit, a first plurality of weights having a first arrangement;
  generating, by the processing circuit, a first set of products, each product of the first set of products being an integer product of a first activation value and a respective weight of a first plurality of weights;
  generating, by the processing circuit, a second set of products, each product of the second set of products being a floating-point product of a second activation value and a respective weight of a second plurality of weights; and
  outputting, by the processing circuit, at least one of the first set of products or the second set of products for use by the neural network,
  each of the weights of the first plurality of weights including a least significant sub-word and a most significant sub-word,
  the most significant sub-word of a first weight of the first plurality of weights being nonzero,
  the most significant sub-word of a second weight of the first plurality of weights being zero,
  the generating of the first set of products comprising:

processing the first plurality of weights to have a second arrangement different from the first arrangement;
storing the first plurality of weights arranged according to the second arrangement into a first memory space;
multiplying, in a first multiplier, the first activation value by the least significant sub-word of the first weight stored in the first memory space to form a first partial product;
multiplying, in a second multiplier, the first activation value by the least significant sub-word of the second weight stored in the first memory space;
multiplying, in a third multiplier, the first activation value by the most significant sub-word of the first weight to form a second partial product; and
adding the first partial product and the second partial product;
the forming of the second set of products comprising forming a first floating point product,
the forming of the first floating point product comprising multiplying, in the first multiplier, a first sub-word of a mantissa of the second activation value by a first sub-word of a mantissa of a first weight of the second plurality of weights, to form a third partial product.

2. The method of claim 1, wherein:
the first multiplier is configured to receive a first argument and a second argument,
the first argument has a first argument size,
the second argument has a second argument size, and
the first argument size is greater than the second argument size.

3. The method of claim 2, wherein:
the forming of the first floating point product comprises:
receiving, by the first multiplier, a first argument;
receiving, by the first multiplier, a second argument; and
multiplying the first argument by the second argument;
the first argument includes:
the first sub-word of the mantissa of the second activation value, and
a second sub-word of the mantissa of the second activation value; and
the second argument includes the first sub-word of the mantissa of the first weight of the second plurality of weights.

4. The method of claim 2, wherein:
the forming of the first floating point product comprises:
receiving, by the first multiplier, a first argument;
receiving, by the first multiplier, a second argument; and
multiplying the first argument by the second argument;
the first argument includes:
the first sub-word of the mantissa of the first weight of the second plurality of weights, and
a second sub-word of the mantissa of the first weight of the second plurality of weights; and
the second argument includes the first sub-word of the mantissa of the second activation value.

5. The method of claim 2, wherein the second multiplier is configured to receive a first argument having a first size and a second argument having a second size, the first size being greater than the second size.

6. The method of claim 5, wherein:
the forming of the second set of products further comprises forming a second floating point product;
the forming of the second floating point product comprises:
receiving, by the second multiplier, a first argument;
receiving, by the second multiplier, a second argument; and
multiplying the first argument received by the second multiplier by the second argument received by the second multiplier;
the first argument received by the second multiplier includes:
the first sub-word of the mantissa of the first activation value, and
a sub-word composed of zeros; and
the second argument received by the second multiplier includes:
a third sub-word of the mantissa of the first weight of the second plurality of weights.

7. The method of claim 1, wherein the adding of the first partial product and the second partial product comprises performing an offset addition in a first offset adder.

8. The method of claim 1, wherein the forming of the second set of products further comprises forming a second floating point product, the forming of the second floating point product comprising multiplying, in the third multiplier, the first sub-word of a mantissa of the second activation value by a second sub-word of a mantissa of the first weight of the second plurality of weights.

9. The method of claim 8, further comprising adding the first floating point product and the second floating point product.

10. The method of claim 9, wherein the adding of the first floating point product and the second floating point product comprises performing an offset addition in a first offset adder.

11. A system for performing computations by a neural network, the system comprising:
a processing circuit comprising:
a first multiplier;
a second multiplier; and
a third multiplier,
the processing circuit being configured to:
identify a first plurality of weights having a first arrangement;
generate a first set of products, each product of the first set of products being an integer product of a first activation value and a respective weight of a first plurality of weights;
generate a second set of products, each product of the second set of products being a floating-point product of a second activation value and a respective weight of a second plurality of weights; and
output at least one of the first set of products or the second set of products for use by the neural network,
each of the weights of the first plurality of weights including a least significant sub-word and a most significant sub-word,
the most significant sub-word of a first weight of the first plurality of weights being nonzero,
the most significant sub-word of a second weight of the first plurality of weights being zero,
wherein in generating the first set of products, the processing circuit is configured to:
process the first plurality of weights to have a second arrangement different from the first arrangement;
store the first plurality of weights arranged according to the second arrangement into a first memory space;

multiply, in the first multiplier, the first activation value by the least significant sub-word of the first weight stored in the first memory space to form a first partial product;

multiply, in the second multiplier, the first activation value by the least significant sub-word of the second weight stored in the first memory space;

multiply, in the third multiplier, the first activation value by the most significant sub-word of the first weight to form a second partial product; and add the first partial product and the second partial product;

wherein in generating the second set of products, the processing circuit is configured to generate a first floating point product, wherein in generating the first floating point product, the processing circuit is configured to multiply, in the first multiplier, a first sub-word of a mantissa of the second activation value by a first sub-word of a mantissa of a first weight of the second plurality of weights, to generate a third partial product.

12. The system of claim 11, wherein:
the first multiplier is configured to receive a first argument and a second argument,
the first argument has a first argument size,
the second argument has a second argument size, and
the first argument size is greater than the second argument size.

13. The system of claim 12, wherein:
the forming of the first floating point product comprises:
  receiving, by the first multiplier, a first argument;
  receiving, by the first multiplier, a second argument; and
  multiplying the first argument by the second argument;
the first argument includes:
  the first sub-word of the mantissa of the second activation value, and
  a second sub-word of the mantissa of the second activation value; and
the second argument includes the first sub-word of the mantissa of the first weight of the second plurality of weights.

14. The system of claim 12, wherein:
the forming of the first floating point product comprises:
  receiving, by the first multiplier, a first argument;
  receiving, by the first multiplier, a second argument; and
  multiplying the first argument by the second argument;
the first argument includes:
  the first sub-word of the mantissa of the first weight of the second plurality of weights, and
  a second sub-word of the mantissa of the first weight of the second plurality of weights; and
the second argument includes the first sub-word of the mantissa of the second activation value.

15. The system of claim 12, wherein the second multiplier is configured to receive a first argument having a first size and a second argument having a second size, the first size being greater than the second size.

16. The system of claim 15, wherein:
the forming of the second set of products further comprises forming a second floating point product;
the forming of the second floating point product comprises:
  receiving, by the second multiplier, a first argument;
  receiving, by the second multiplier, a second argument; and
  multiplying the first argument received by the second multiplier by the second argument received by the second multiplier;
the first argument received by the second multiplier includes:
  the first sub-word of the mantissa of the first activation value, and
  a sub-word composed of zeros; and
the second argument received by the second multiplier includes:
  a third sub-word of the mantissa of the first weight of the second plurality of weights.

17. The system of claim 11, wherein the adding of the first partial product and the second partial product comprises performing an offset addition in a first offset adder.

18. The system of claim 11, wherein the forming of the second set of products further comprises forming a second floating point product, the forming of the second floating point product comprising multiplying, in the third multiplier, the first sub-word of a mantissa of the second activation value by a second sub-word of a mantissa of the first weight of the second plurality of weights.

19. The system of claim 18, wherein the processing circuit is further configured to add the first floating point product and the second floating point product.

20. A system for performing computations by a neural network, the system comprising:
means for processing, the means for processing comprising:
  a first multiplier;
  a second multiplier; and
  a third multiplier,
the means for processing being configured to:
  identify a first plurality of weights having a first arrangement;
  generate a first set of products, each product of the first set of products being an integer product of a first activation value and a respective weight of a first plurality of weights;
  generate a second set of products, each product of the second set of products being a floating-point product of a second activation value and a respective weight of a second plurality of weights; and
  output at least one of the first set of products or the second set of products for use by the neural network,
each of the weights of the first plurality of weights including a least significant sub-word and a most significant sub-word,
the most significant sub-word of a first weight of the first plurality of weights being nonzero,
the most significant sub-word of a second weight of the first plurality of weights being zero,
wherein in generating the first set of products, the means for processing is configured to:
  process the first plurality of weights to have a second arrangement different from the first arrangement;
  store the first plurality of weights arranged according to the second arrangement into a first memory space;
  multiply, in the first multiplier, the first activation value by the least significant sub-word of the first weight stored in the first memory space to form a first partial product;
  multiply, in the second multiplier, the first activation value by the least significant sub-word of the second weight stored in the first memory space;

multiply, in the third multiplier, the first activation value by the most significant sub-word of the first weight to form a second partial product; and
add the first partial product and the second partial product;
wherein in generating the second set of products, the means for processing is configured to generate a first floating point product,
wherein in generating the first floating point product, the means for processing is configured to multiply, in the first multiplier, a first sub-word of a mantissa of the second activation value by a first sub-word of a mantissa of a first weight of the second plurality of weights, to generate a third partial product.

* * * * *